United States Patent
Ophardt (10) Patent No.: US 7,234,612 B2
(45) Date of Patent: Jun. 26, 2007

(54) TIME DELAY SOAP DISPENSER

(75) Inventor: Heiner Ophardt, Vineland (CA)

(73) Assignee: Hygiene-Technik Inc., Beamsville, Ontario (CA)

(*) Notice: Subject to any disclaimer, the term of this patent is extended or adjusted under 35 U.S.C. 154(b) by 282 days.

(21) Appl. No.: 11/126,514

(22) Filed: May 11, 2005

(65) Prior Publication Data

US 2005/0263545 A1    Dec. 1, 2005

(30) Foreign Application Priority Data

May 26, 2004    (CA) ................................ 2468367

(51) Int. Cl.
*B65D 47/00*    (2006.01)
(52) U.S. Cl. .................... 222/477; 222/181.3
(58) Field of Classification Search ............ 222/477, 222/639, 642, 644, 181.3, 181.2, 325; 251/90; 137/624.11

See application file for complete search history.

(56) References Cited

U.S. PATENT DOCUMENTS

| | | | | |
|---|---|---|---|---|
| 3,182,857 A | * | 5/1965 | Bischoff et al. | 222/647 |
| 3,459,343 A | * | 8/1969 | Holger | 222/477 |
| 4,220,266 A | * | 9/1980 | Braden et al. | 222/477 |
| 4,718,588 A | | 1/1988 | Arabian et al. | |
| 5,431,309 A | | 7/1995 | Ophardt | |
| 5,489,044 A | | 2/1996 | Ophardt | |
| 5,797,815 A | | 8/1998 | Goldman et al. | |

* cited by examiner

Primary Examiner—Kevin Shaver
Assistant Examiner—Stephanie E. Tyler
(74) Attorney, Agent, or Firm—Riches, McKenzie & Herbert LLP (57) ABSTRACT

A delay mechanism including one or more suction cups which during a normal cycle of dispensing from a liquid dispenser come to engage on a surface and thereby delay the return of an actuating member in the dispenser to a position for further dispensing until such time as the suction cup disengages from the surface.

8 Claims, 10 Drawing Sheets

TIME DELAY SOAP DISPENSER

SCOPE OF THE INVENTION

This invention relates to soap dispensers and, more particularly, to a soap dispenser with a time delay mechanism to delay the time between dispensing cycles.

BACKGROUND OF THE INVENTION

Many dispensers for flowable materials such as hand soaps, hand lotions, creams, alcohol cleaners and other flowable materials whether powders, pastes or liquids or combinations thereof are known which dispense individual allotments of the material in a cycle of operation. Many such known dispensers suffer the disadvantage that they are open to use by users so as to dispense more material that is necessary as by repeated cycling of the dispensing mechanism in a short period of time. The use of excessive amounts of material is particularly objectionable where the material being dispensed is expensive.

SUMMARY OF THE INVENTION

To at least partially overcome this disadvantage of previously known devices, the present invention provides a delay mechanism which delays the return of a cycling activation member to a position which permits a new cycle of dispensing.

An object of the present invention is to provide a time delay mechanism to delay the time between dispensing cycles in a dispenser of flowable materials such as soap.

Another object is to increase the time required for an individual cycle in a cyclic fluid dispenser.

Another object is to provide an inexpensive mechanical time delay mechanism applicable to dispensers for flowable materials.

In accordance with the present invention, there is provided a delay mechanism including one or more suction cups which during a normal cycle of dispensing from a liquid dispenser come to engage on a surface and thereby delay the return of an actuating member in the dispenser to a position for further dispensing until such time as the suction cup disengages from the surface. The dispensing mechanism preferably has a spring biased actuating member such as a lever which may be moved in a cycle of dispensing between a retracted position and an extended position. The suction cup may be carried on the actuating member such that on movement to one extreme of the cycle as, for example, to a retracted position, comes to engage a fixed support member and thus until such time as the suction cup may disengage from the fixed support member by losing its vacuum, prevents the movement of the actuating member under the bias of the spring to the other, extended position.

In one aspect, the present invention provides a soap dispenser comprising a dispensing mechanism for dispensing a flowable material by the cyclical, reciprocal movement of an actuating member between an extended position and a retracted position, a spring biasing the activating member from a first of the extended position and the retracted position to the other, second of the extended position and the retracted position;

a delay mechanism to delay movement of the activating member under the bias of the spring from the first of the extended position and the retracted position, a support member in opposition to the activation member, the delay mechanism comprising a suction cup carried on one of the activating member and the support member, the other of the activating member and the support member carrying an engagement surface disposed for engagement by the suction cup when the activating member is in the first of the extended position and the retracted position, the suction cup engaging the engagement surface and preventing disengagement therewith until sufficient time has passed for air to seep into the suction cup for release of the suction cup from the support member.

The biasing springs and suction cups are arranged so that when the springs are compressed, the suction cups hold the dispensing mechanism in a state against the urging of the springs. As time passes, air seeps under the suction cups and, eventually, the suction cups release. The suction cups thus provide a delay mechanism which ensures that the dispensing mechanism remains stationary for a few seconds before it is moved under the bias of the springs.

BRIEF DESCRIPTION OF THE DRAWINGS

Further aspects and advantages of the present invention will occur from the following description taken together with the accompanying drawings in which.

DETAILED DESCRIPTION OF THE DRAWINGS

Figure 1:
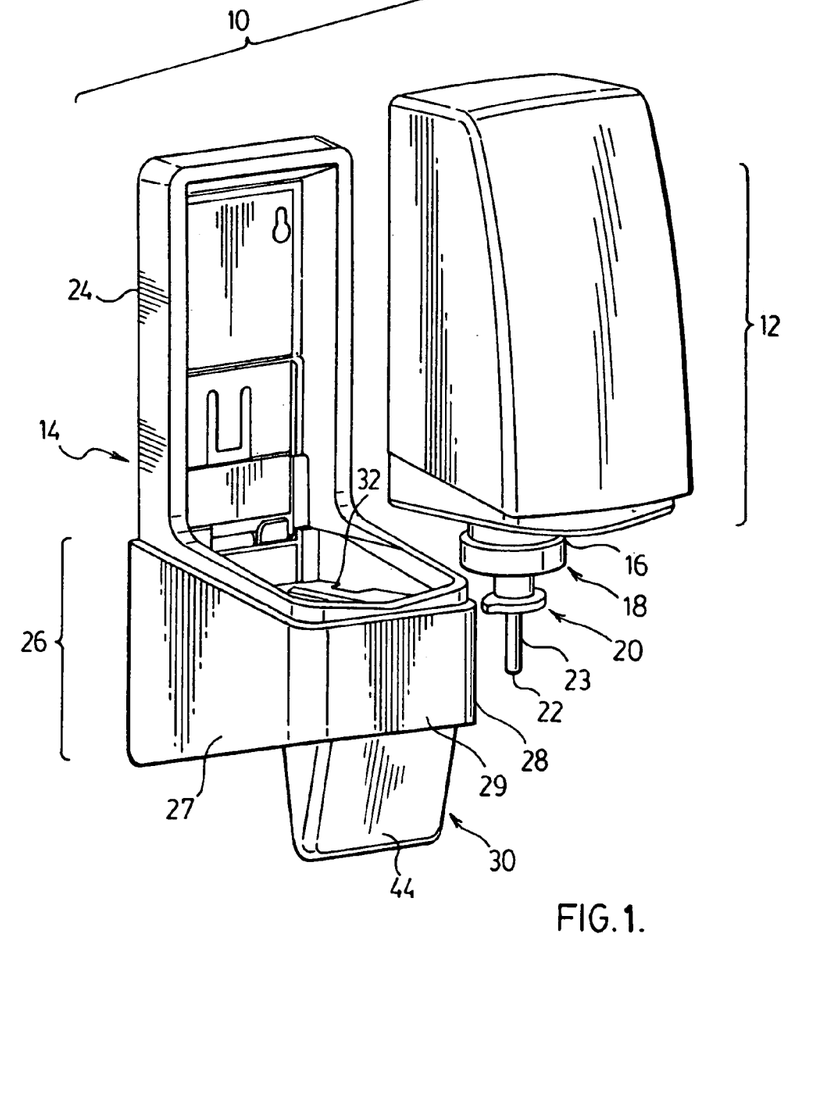
FIG. 1 is a partially exploded pictorial view of a dispenser in accordance with the first embodiment of the invention.

Reference is made first to FIG. 1 which shows a dispenser 10 in accordance with the preferred embodiment of the invention. The dispenser 10 comprises a reservoir 12 and a housing 14.

The reservoir 12 holds fluid such as, for example, liquid hand soap which is to be dispensed. An outlet 16 is provided from the bottom of the reservoir 12 across which there is located a valve assembly 18 to regulate the flow of fluid outwardly therethrough. The valve assembly 18 includes a movable piston element 20 which is reciprocally slidable between an extended position and a retracted position relative to the remainder of the valve assembly to dispense fluid from an outlet 22 at the lower end of an exit tube 23 of the piston element 20.

The housing 14 is adapted to be mounted to a wall via a back plate 24. The housing 14 has a lower portion 26 with two side walls 27 and 28 and a front wall 29. A generally horizontal housing support plate 32 extends forwardly from the back plate to the front wall and between the side walls. The support plate 32 has an opening 34 therethrough having a forward portion and a rear portion. The outlet 16 of the reservoir 12 is adapted to be moved into the forward portion of the opening 34 and then slid rearwardly so as to engage the outlet 16 of the reservoir 12 securely in the rear portion of the opening 34 and with the piston element 20 to be engaged with an activator assembly 30 provided in the housing 14 below the support plate 32. The actuator assembly 30 is movable relative to the housing 14 to activate the movable piston element 20 of the valve assembly 18 to dispense fluid.

Figure 2:
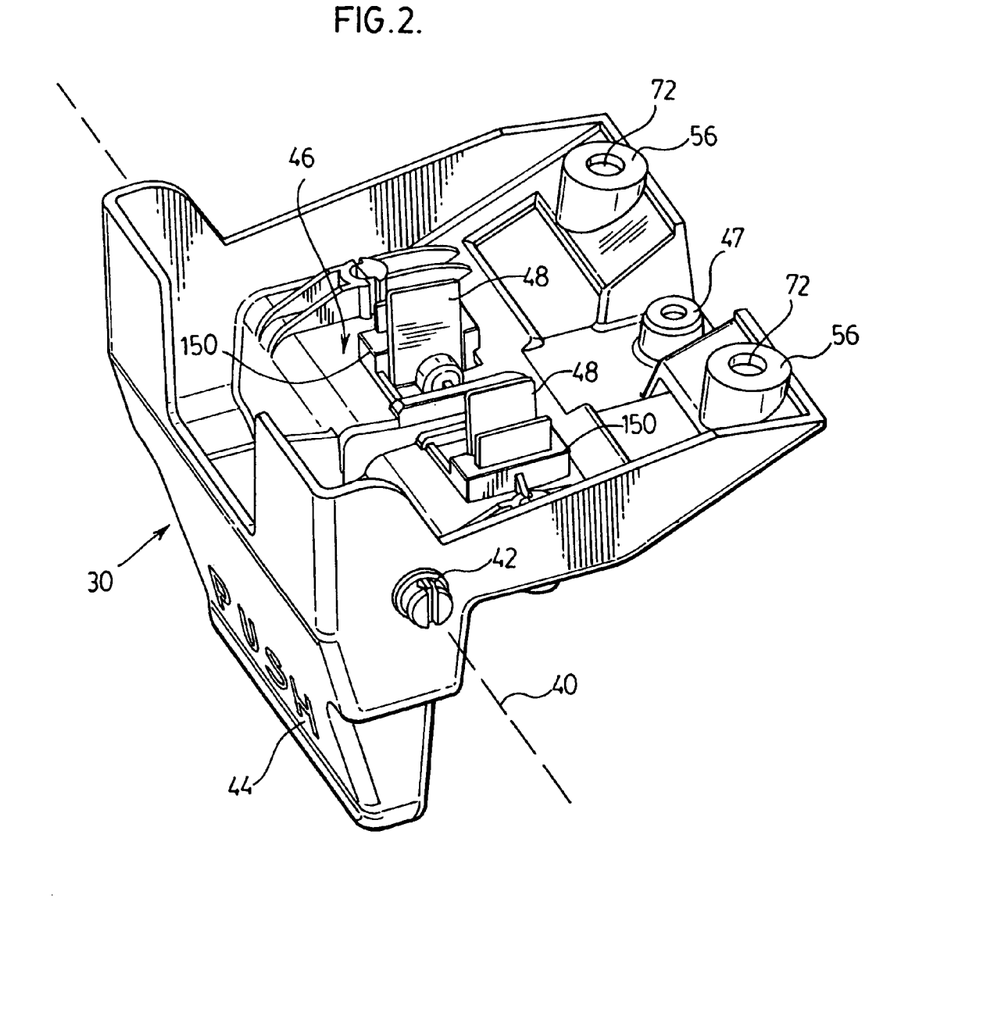
FIG. 2 is a pictorial top view of an actuator member for the dispenser as shown in FIG. 1 without the suction cups applied.
Figure 3:
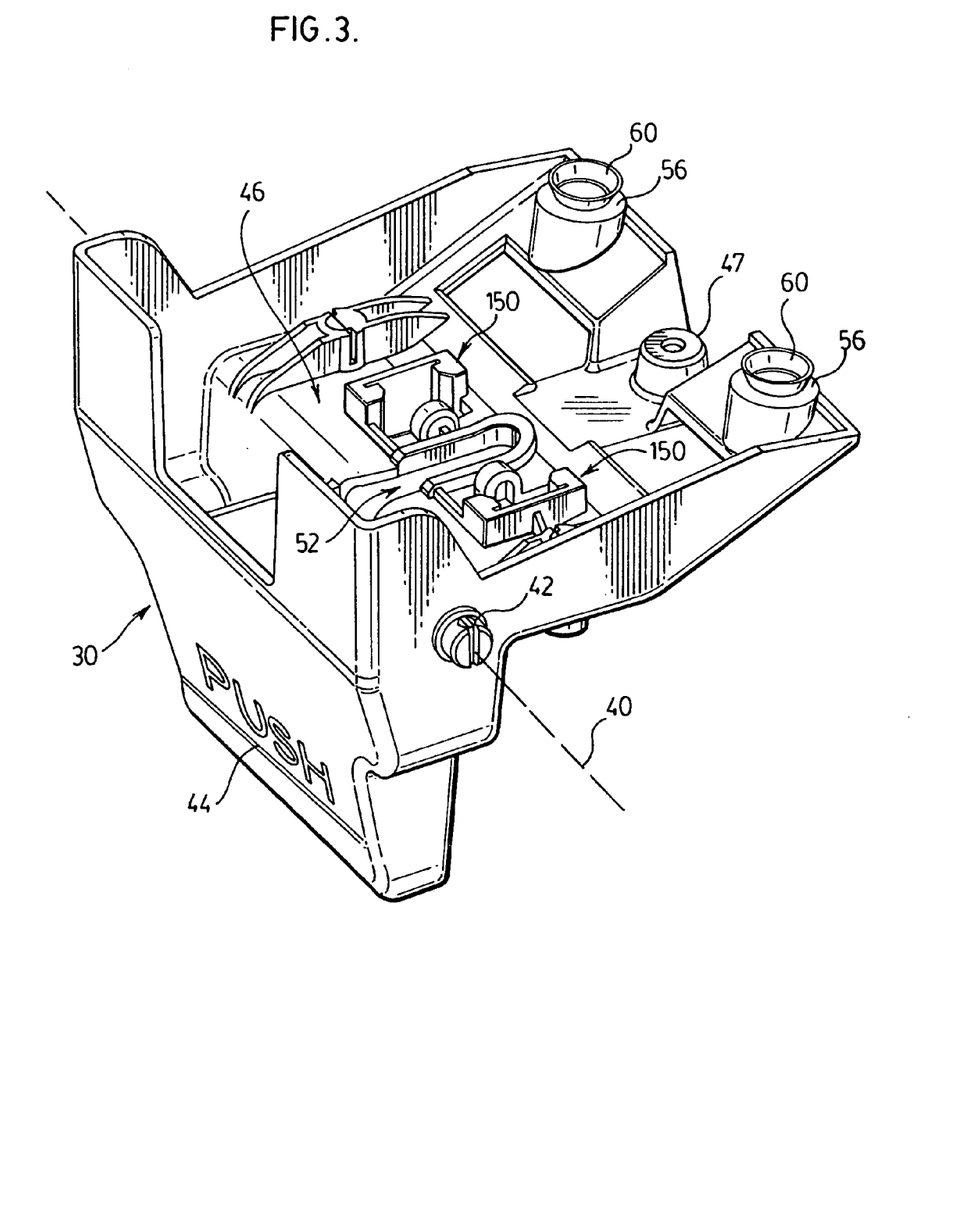
FIG. 3 is a pictorial view identical to FIG. 2 but showing the suction cups applied.
Figure 4:
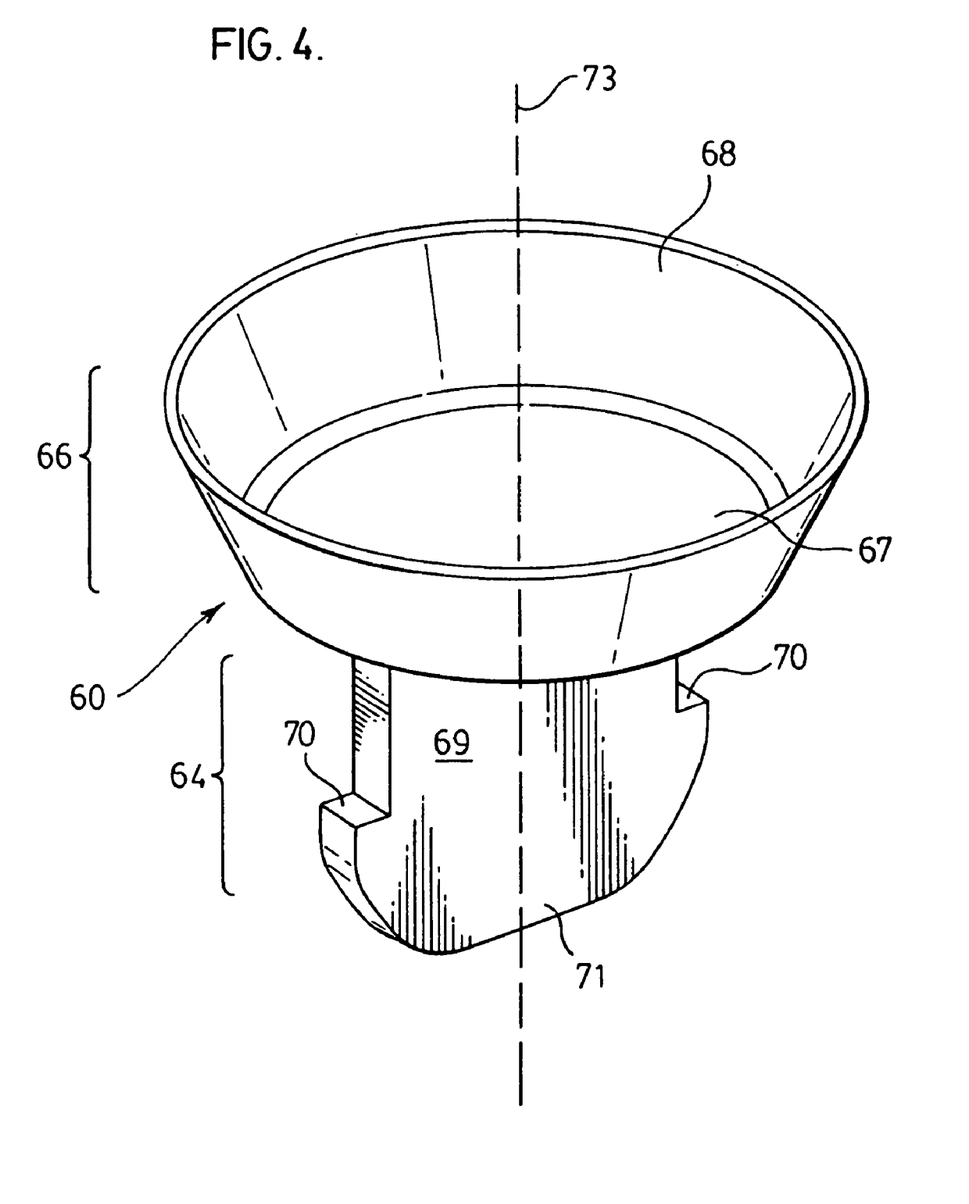
FIG. 4 is a pictorial view of one suction cup shown in FIG. 3.
Figure 10:
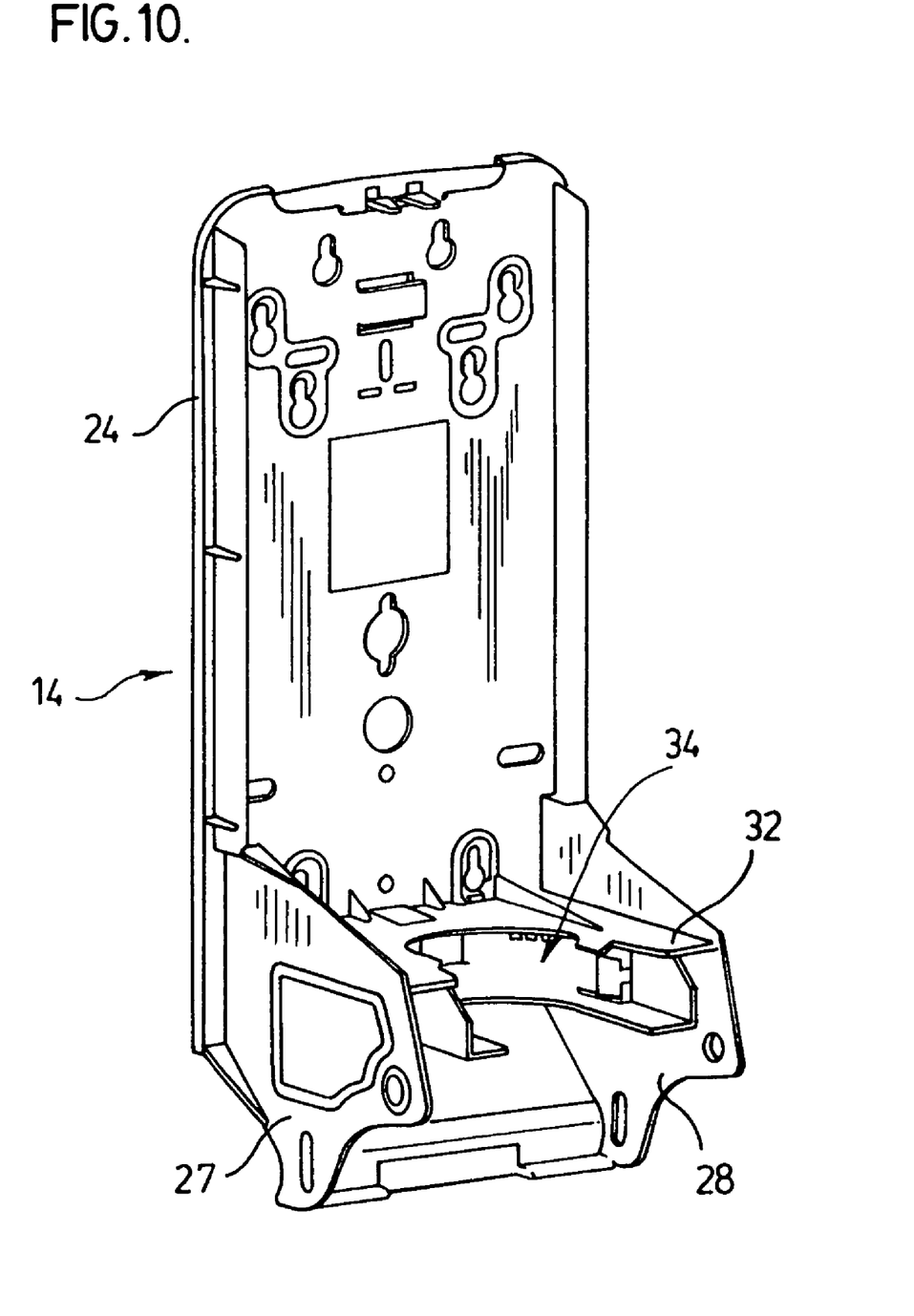
FIG. 10 is a pictorial view of a modified form of the housing shown in FIG. 1 adapted to receive the reservoir by sliding forward for insertion and for use with a shroud, not shown.

FIG. 10 shows an alternate housing 14 to that in FIG. 2 which is adapted for use with the actuator assembly 30 shown in FIGS. 3 and 4. FIG. 10 shows openings 200 in side walls 27 and 28 to receive the stub axles 42 of the actuator assembly 30.

Figure 5:
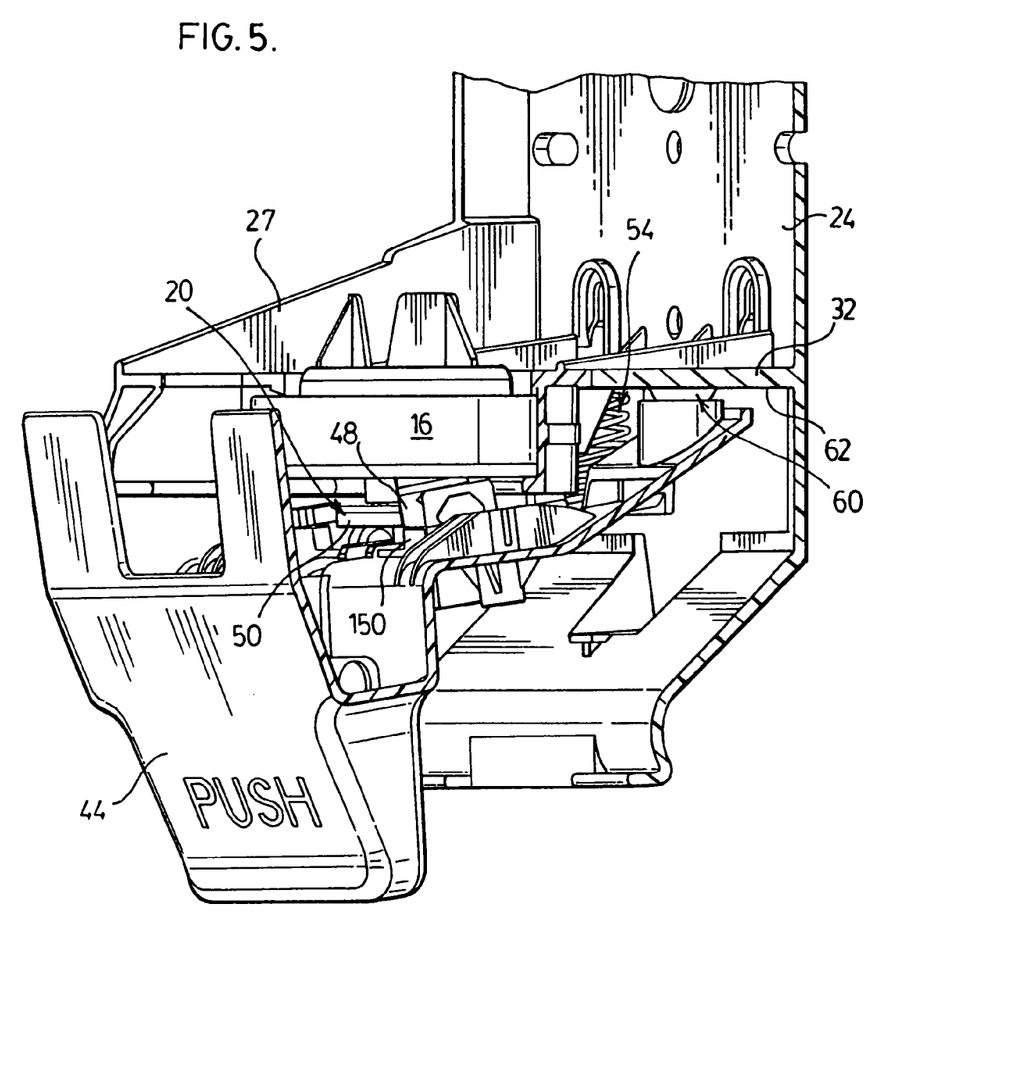
FIG. 5 is a schematic pictorial, partly cross-sectional view of a dispenser similar to that in FIG. 1 in a retracted position and with the reservoir other than the dispensing pump assembly not shown.
Figure 6:
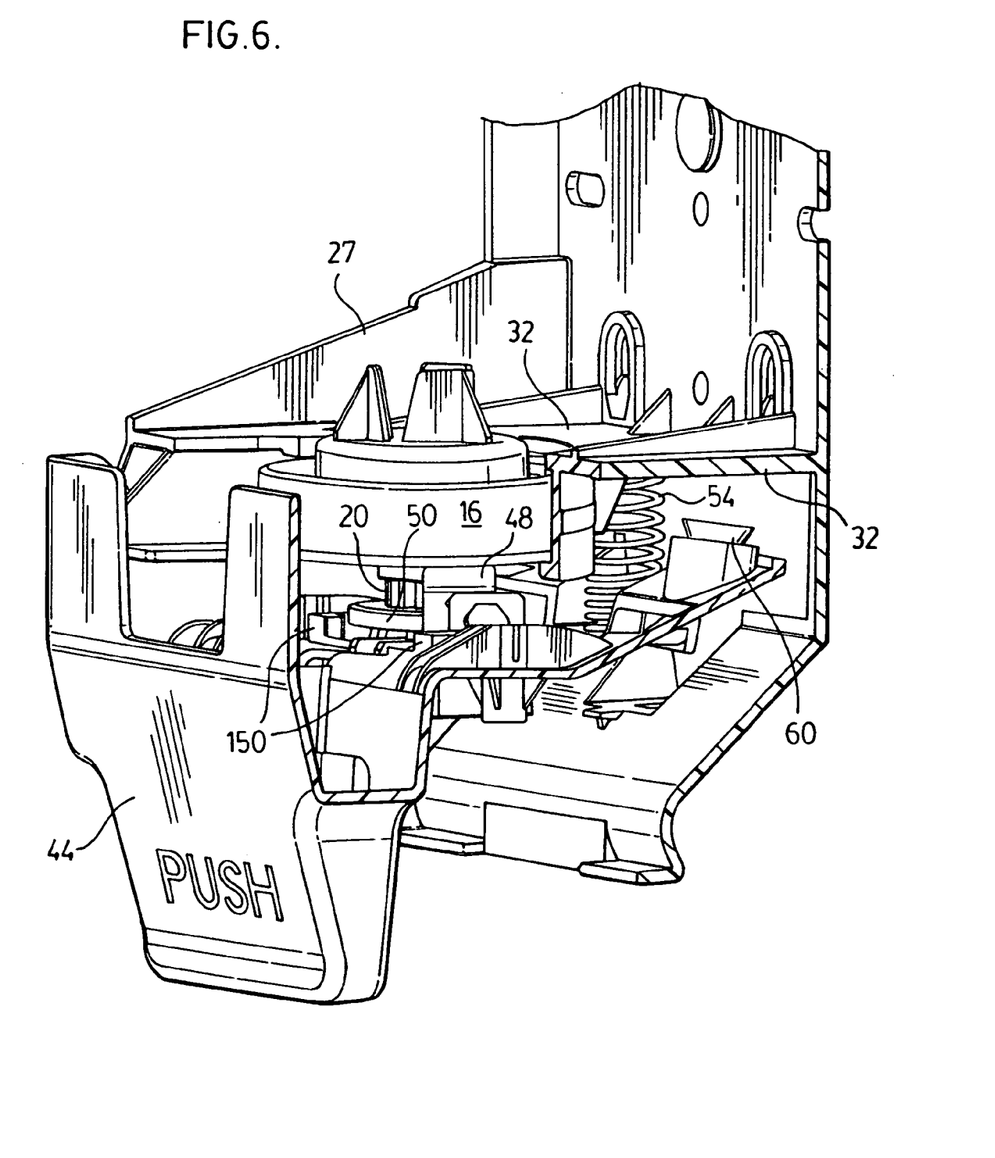
FIG. 6 is a view of the same as that shown in FIG. 5, however, with the presser in an intermediate position between the retracted position and the extended position.

The actuator assembly 30 is adapted for pivoting relative to the housing 14 about a horizontal axis 40 on stub axles 42 which are engaged within journaling bores provided in the side walls 27 and 28 of the housing 14. The actuator assembly 30 has a hand lever 44 which extends downwardly at a forward end of the actuator assembly 30 and is adapted to be manually engaged by a user and urged towards a wall supporting the housing 14 to dispense fluid. The actuator assembly 30 includes an actuator plate 46 which extends rearwardly from the hand lever 44. The actuator plate 46 carries engagement fingers 48, shown in FIG. 2 but not FIG. 3, to engage a flange 50 of the piston element 20 as best seen in FIGS. 5 and 6. The actuator plate 46 has an opening 52 formed between the fingers 48 through which the exit tube 23 of the piston element 20 is to extend.

The fingers 48 preferably are metal members to be secured in two holders 150. For ease of illustration, the fingers 48 are only shown in some of the holders 150.

The upper surface of the actuator plate 46 carries a spring stub 47 upon which a helical coil spring 54 is to be received.

The actuator assembly 30 is thus pivotally mounted on the stub axles 42 located below the housing support plate 32 with the spring 54 biasing the actuator plate 46 downwardly away from the housing support plate 32 and thus biasing the piston element 20 to an extended position. A lower horizontally inwardly extending flange 90, seen in FIG. 8, carried at a lower portion of the back plate 24 provides a stop surface which is engaged by a rearwardmost end of the actuator plate 32 below the spring stub 47 to limit pivoting of the actuator member 30 under the bias of the spring 54 to a fully extended position. The spring 54 is not shown in FIG. 7 or 8. On a user urging the hand lever 44 rearwardly towards the back plate, the actuator assembly 30 rotates about the axis 40 on the stub axles 42 moving the actuator plate 46 upwardly towards the housing support plate 32 and thus moving the piston element 20 to a retracted position compressing the spring 54. On release of the actuator assembly 30 by a user, the bias of the spring 54 will exert forces attempting to return the actuator assembly 30 to its extended position and thus complete a single stroke of operation during which fluid is dispensed, preferably, with fluid being dispensed during the movement from the extended position to the retracted position. The construction and operation of a dispenser in accordance with the present invention may be substantially the same as that described in the applicant's U.S. Pat. No. 5,431,309, issued Jul. 11, 1995, which is incorporated herein by reference.

Figure 7:
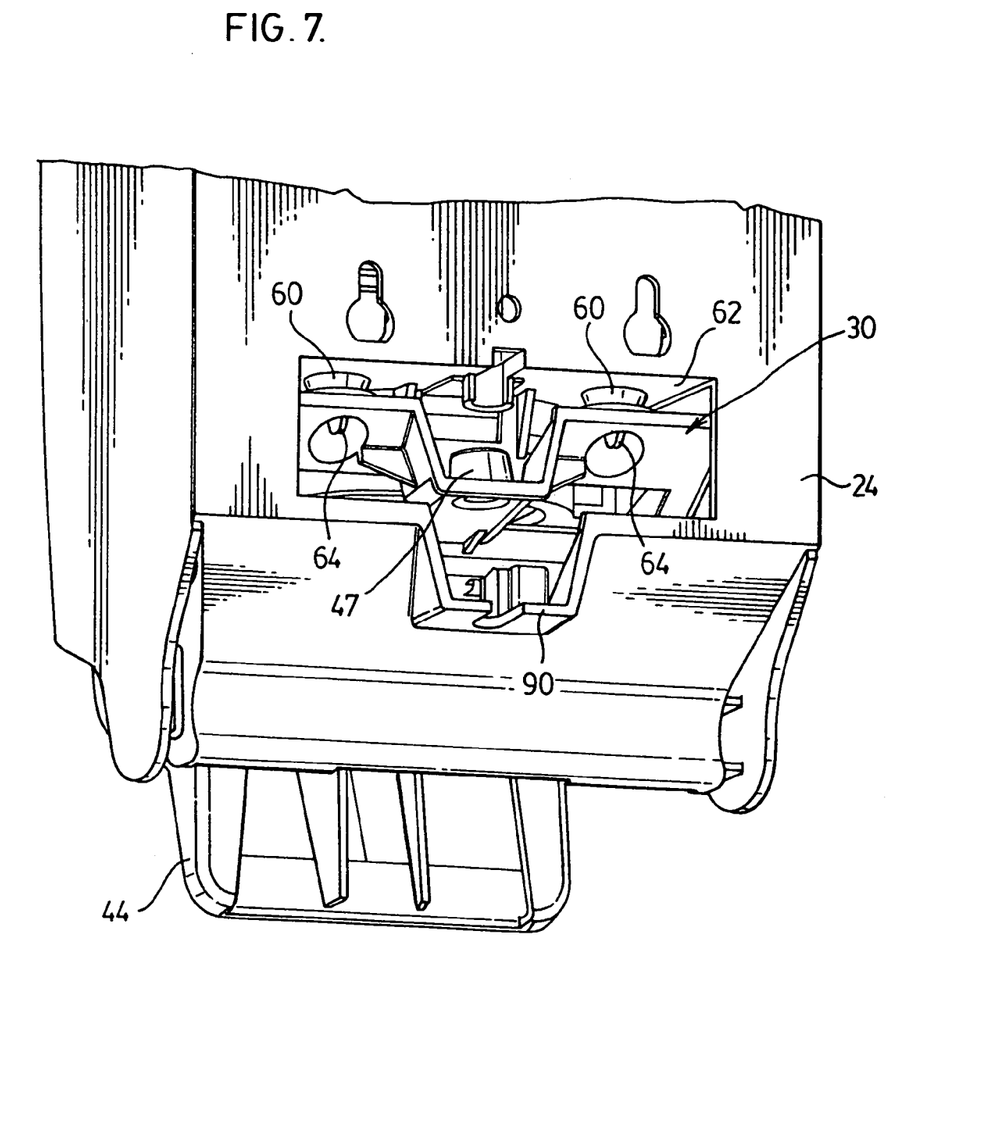
FIG. 7 is a schematic rear view of a lower portion of an assembled dispenser shown in FIG. 5 with, for purposes of illustration, the spring removed and with the actuator member in a recessed position as shown in FIG. 5.
Figure 8:
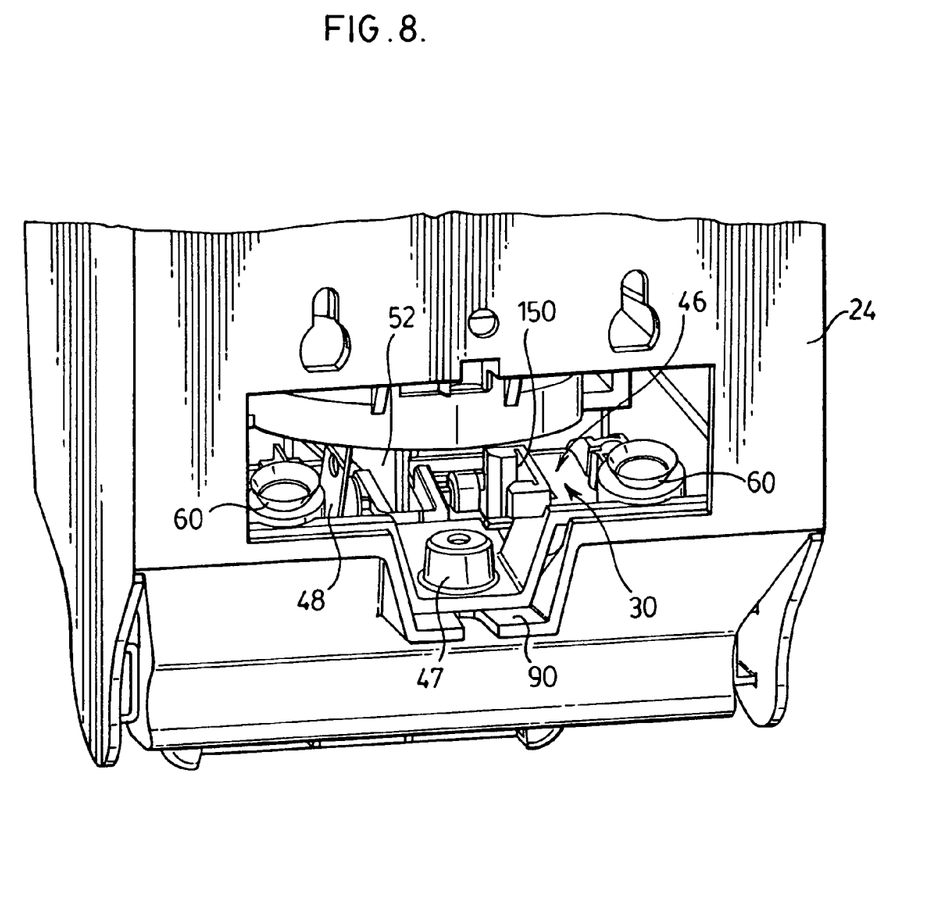
FIG. 8 is a view identical to that in FIG. 7, however, showing the actuator member in an extended position.

The actuator plate 46 includes two cup mount surfaces 56 upon which two suction cups 60 are respectively removably mounted with the suction cups directed upwardly for engagement with an under surface 62 of the housing support plate 32 as best seen in FIG. 7. In this regard, the under surface 62 of the housing support plate 32 to be engaged by the suction cups 60 are provided to be flat planar surfaces. One suction cup 60 is shown in FIG. 4 as having a pronged attachment portion 64 and a cup portion 66. The cup portion 66 has a generally circular end wall 67 from which a generally frustoconical side wall 68 extends. The attachment portion 64 comprises a flat planar member which extends axially away from the circular end wall 67 in a direction opposite to that of the cup portion 66 and which has a reduced width throat portion 69 such that shoulders 70 are formed on the opposite sides of the attachment portion. The attachment portion 64 tapers from the shoulders 70 towards its distal end 71. The attachment portion 64 thus forms a simplified hook member which is adapted to be urged through a circular opening 72 formed in the cup mount surfaces 56 of actuator plate 46 to removably secure each suction cup 60 to the activator plate.

The suction cups 60 are mounted on the activator plate member 46 disposed in a manner such that as the actuator member 30 is pivoted from the extended position to the fully retracted position, the suction cups 60 come to engage the under surface 62 of the housing support plate 32 and are substantially disposed with an axis 73 of the suction cup members 60 normal to the under surface 62 of the housing support plate.

The suction cups 60 are formed from a resilient elastomeric material such as rubber or plastic such that when they are engaged and compressed onto the flat planar under surface 62 of the housing support plate 32, the suction cups are axially compressed with air inside the cup portion 66 of the suction cup 60 exhausted, thereby creating an inherent vacuum inside the suction cup portion as a result of the suction cup, while collapsed, having on one hand, the side walls of the suction cup portion 66 adopting an inherent bias to assume their uncompressed condition and, on the other hand, a peripheral inner end of the side walls 68 engaging the flat planar under surface of the housing support plate in a sealed manner to resist air from passing between the inner end of the suction cups and the flat planar housing support plate. Therefore, when the actuator member 30 is compressed to the retracted position, the suction cups 60 become compressed and engage the housing support plate 32 and temporarily delay the bias of the spring 54 from moving the actuator member 30 from the retracted position to the extended position.

With time, air will leak into each of the suction cups 60, that is, between the inner end of the suction cups and the flat planar surface of the housing support plate 32 with the result that after some delay time, the suction cups 60 will become released from engagement with the housing support plate 32 and the actuator member 30 will be moved by the spring 54 to the extended position.

The size and nature of the suction cups 60 and the under surface 62 of the housing support plate 32 which they are to engage can be selected, together with the nature of the spring 54, so as to provide for suitable time delays from a time when the suction cups are compressed onto the housing support plate and when they come to be released therefrom. Preferred suction cups 60 are such as those shown which have cup portions 66 are closed and in which air leakage is provided by leakage about the peripheral end of the suction cup wall 68. Other suction cup type devices may be provided as, for example, which may have an air entrance or orifice through a wall in the suction cup which facilitates leakage into the suction cups of small amounts of air via an air supply valve which may, to some extent, be regulatable.

In operation with a dispenser 10 in accordance with the present invention incorporating suction cups, after a user moves the actuator member 30 to the fully extended position to dispense an allotment of fluid, the suction cups 60 hold the actuator member 30 in a fully extended position and provide a time delay before the actuator member 30 may move to the extended position. This provides a necessary time delay or pause between the times within which a user may move the actuator member 30 again to the retracted position to dispense further fluid. This time delay thus can be appreciated as a simple vehicle to assist in reducing the number of times that the actuator member 30 can be moved through a dispensing cycle in any given period of time, thus, preferably, limiting a user against dispensing as much fluid in any time period as a user might if the time delay mechanism were not provided.

The present invention provides a dispenser which may or may not have suction cups attached. This provides the advantage that a single dispenser configuration may be provided with the suction cups merely attached to those dispensers for which a time delay in dispensing may be desired. The suction cups 60 are removably attached. Operation of the dispenser is without time delay when the suction cups are not attached.

The preferred embodiment illustrates the use of two suction cups 60, each to simultaneously engage the housing support plate 32. It is to be appreciated that merely a single suction cup could be used in which case, preferably, the suction cup may be mounted centrally between the side walls of the housing and, for example, in which case possibly a pair of springs could be provided.

The suction cups 60 have been illustrated as mounted to the actuator member 30. It is to be appreciated that a suction cup merely needs to be operative so as to temporarily couple the actuator member 30 to the housing 14. The suction cup members 60 could as easily be provided on the under surface 62 of the housing support plate 32 and engage an engagement surface on the actuator plate 46 of the actuator member 30.

Rather than have a suction cup engage a flat planar surface, it is possible to adopt a configuration in which two opposite suction cups are provided with each suction cup to engage the other and with one suction cup carried on one of the actuator member 30 and the other on the housing.

The preferred embodiment illustrates the actuator member 30 as having a generally horizontally disposed actuator plate 46 in opposition to a generally horizontally disposed housing support plate 32 and with the suction cups 60 provided between opposed surfaces. It is to be appreciated that the suction cups may be provided on any opposed surfaces of the actuator member 30 or the housing 14 which are to be moved towards and away from each other. For example, while it is preferred and convenient that the housing support plate 32 which provides the opening 34 via which the reservoir 12 is secured to the housing 14 also provide the under surface 62 for engagement by the suction cups 60, this is not necessary.

The suction cups 60 have been illustrated as disposed with the cup axis vertical. This is not necessary and opposed surface between the actuator member 30 and the housing 14 could be provided with the suction cups to be disposed or at any angle as, for example, with the suction cups 60 provided on an extension of the hand lever 44 interiorly behind and in opposition to the interior of the front wall 29 of the housing 14.

The preferred embodiment of the invention illustrates a dispenser 10 in which the actuator member 30 is pivotally mounted to the housing 14. This is not necessary. An actuator mechanism may be provided in which the equivalent to the actuator plate is mounted for sliding linearly towards and away from the housing support plate and with, for example, a separate lever to move it.

The preferred dispenser illustrated provides for dispensing by vertical movement of the piston element.

Other known soap and fluid dispensers provide for a fluid dispensing pump whose piston is movable horizontally as by an actuator member which is slidable horizontally and biased to an outward position by a spring. Pumping occurs by urging the button from its extended position towards the wall to a retracted position with such movement moving a piston from an extended position to a retracted position. In such pumps, it is to be appreciated that a time delay arrangement similar to that described with the preferred embodiment may be provided as, for example, with a suction cup coupled to the horizontal actuator member and disposed to engage a vertical surface on the housing as, for example, on a rear surface of the housing.

Similarly, soap dispensers are known in which a top push button at the top of a dispenser may be pushed downwardly against the bias of a spring so as to dispense fluid. Such dispensers are particularly useful for placement as, for example, on a countertop near a sink. Time delay suction cups may be provided between the top push button and horizontal top surfaces of fluid containing container or housing.

Figure 9:
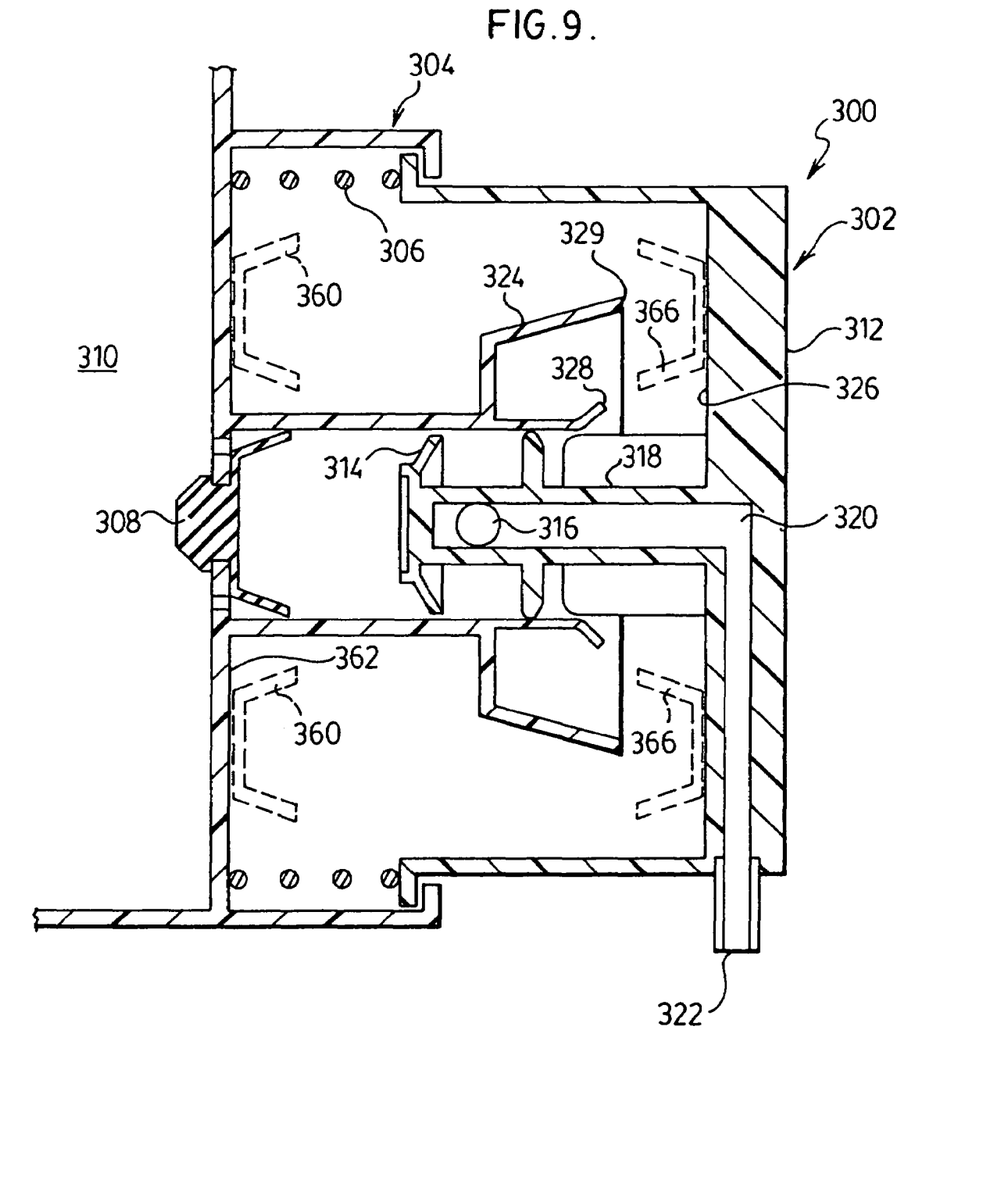
FIG. 9 is a schematic cross-sectional side view of a dispenser in accordance with the second embodiment of the invention.

Reference is made to FIG. 9 which illustrates a second embodiment of a dispenser in accordance with the present invention showing a time delay suction cup disposed coaxially about a pump assembly. The dispenser 300 includes a piston member 302 which is axially slidable relative to a piston chamber forming member 304 and biased outwardly by a spring 306. The piston chamber forming member has a one-way valve 308 at its inner end providing one-way communication outwardly from a reservoir 310 containing the fluid to be dispensed. The piston member 302 has an exterior surface 312 adapted to be engaged by a user and pushed to the left as seen to dispense fluid past a one-way sealing vane 314 into an inlet 316 inside a hollow tube 318 of the piston member 302 and, hence, out a passageway 320 to an outlet 322. The structure of the pump forming piston and piston chamber forming member may be in accordance with one of the arrangements disclosed in the applicant's U.S. Pat. No. 5,489,044, issued Feb. 6, 1996. The piston chamber forming member 304 carries a suction cup member 324 coaxially thereabout which is adapted to engage with an annular sealing flange 329 and an inside surface 326 of the piston member 302 to temporarily secure the piston member 302 to the piston chamber forming member 304. To ensure a proper seal is formed by the suction cup 324, the piston chamber forming member 304 may have an internal annular sealing flange 328 about its inner periphery to also engage the inner surface 326 and assist in ensuring that suction is formed within the suction cup 324. Thus, the structure could be considered to provide a double lipped annular suction cup member providing a vacuum between the two flanges 328 and 329.

While the embodiment illustrated in FIG. 9 preferably illustrates an annular suction cup member about the piston chamber forming member, the annular suction cup could alternately be provided annularly on the piston member 302 to engage flat opposed surfaces about the piston chamber forming member.

Alternately, as shown in dotted lines in FIG. 9, one or more suction cups 360 could, for example, be provided in the annular space about the piston chamber forming member 304 coupled to an annular surface 362 of the piston chamber forming member 304 to engage annular planar surfaces 326 on the piston member 302 or oppose suction cups 366 also shown in dotted lines and provided on the piston member 302.

While the invention has been described with reference to preferred embodiments, many modifications and variations of the invention will now occur to persons skilled in the art. For a definition of the invention, reference is made to the following claims.

I claim:

1. A dispenser comprising:
    a dispensing mechanism for dispensing a flowable material by the cyclical, reciprocal movement of an actuating member between an extended position and a retracted position,
    a spring biasing the actuating member from a first position selected from the extended position and the retracted position to a the other, second position selected from the extended position and the retracted position which is not the first position;
    a delay mechanism to delay movement of the actuating member under the bias of the spring from the first of the extended position and the retracted position,
    a support member in opposition to the actuating member,
    the delay mechanism comprising a first suction cup carried on one of the actuating member and the support member,
    the other of the actuating member and the support member carrying an engagement surface disposed for engagement by the first suction cup when the actuating member is in the first position and the retracted position,
    the first suction cup engaging the engagement surface and preventing disengagement therewith until sufficient time has passed for air to seep into the first suction cup for release of the first suction cup from the support member.

2. A dispenser as claimed in claim 1 wherein the actuating member is adapted to be manually engaged and urged against the bias of the spring from the second position to the first position.

3. A dispenser as claimed in claim 2 wherein the actuating member comprises a lever pivotally mounted to a housing for pivotal movement in one direction to the extended position and pivotal movement in a second direction opposite the first direction to the retracted position,
    the spring biasing the actuating member to pivot from a first position to the second position,
    the support member secured to the housing against movement relative to the lever.

4. A dispenser as claimed in claim 3 wherein the first suction cup is carried by the lever spaced from an axis about which the lever is pivotable relative the housing,
    the support member presenting a flat planar surface directly opposed to the first suction cup when the first suction cup engages the support member.

5. A dispenser as claimed in claim 4 wherein the first suction cup is removably mounted to the dispenser for coupling and uncoupling so as to provide a dispenser with the delay mechanism operative when the first suction cup is mounted to the dispenser, and provide a dispenser with the delay mechanism not operative when the first suction cup is not mounted to the dispenser.

6. A dispenser as claimed in claim 1 wherein the engagement surface comprises surfaces of a second suction cup mounted in opposition to the first suction cup with the first suction cup to engage the second suction cup.

7. A dispenser as claimed in claim 1 wherein the dispensing mechanism comprises a piston pump with a piston element coaxially reciprocally movable in a piston chamber forming member,
    the suction cup disposed coaxially about the piston element.

8. A dispenser as claimed in claim 1 including a housing having a generally horizontal housing support plate having an under surface,
    the dispensing mechanism comprising a piston pump with a piston chamber forming member coupled to an outlet of a reservoir and a piston element coaxially slidable in the piston chamber forming member,
    the actuating member coupled to the housing below the housing support plate for moving relative the housing support plate between the extended position and the retracted position,
    the reservoir removably coupled to the housing support plate with the piston pump extending through the housing support plate for coupling to the actuating member for movement of the piston pump with the actuating member,
    the spring disposed between the housing and the actuating member,
    the first suction cup carried on the actuating member,
    the engagement surface comprising the under surface of the housing support plate.

\* \* \* \* \*